Figure 1:
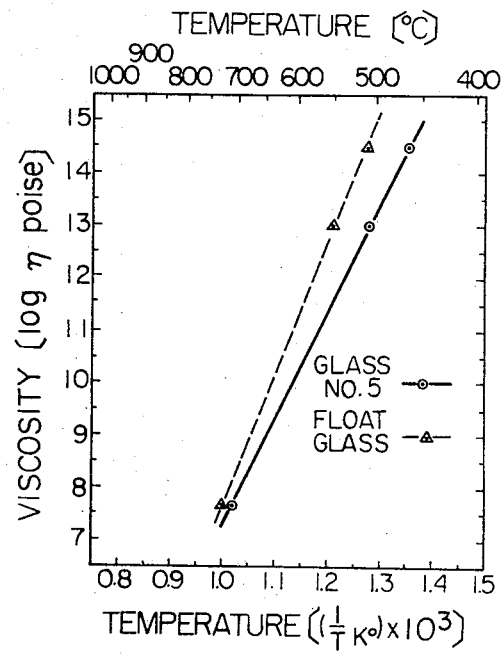

United States Patent [19]

Hara et al.

[11] 3,772,135

[45] Nov. 13, 1973

[54] GLASS STRENGTHENED BY ION EXCHANGE AND METHOD OF PREPARING THE SAME

[75] Inventors: Morihisa Hara; Yoshiro Suzuki, both of Tokyo; Hironori Ohta; Michihiko Uemura, both of Kanagawa-ken, all of Japan

[73] Assignee: Asahi Glass Co., Ltd., Tokyo, Japan

[22] Filed: Apr. 17, 1972

[21] Appl. No.: 244,851

Related U.S. Application Data

[63] Continuation of Ser. No. 52,406, July 6, 1970, abandoned.

[30] Foreign Application Priority Data

July 10, 1969 Japan.................................. 44/54101

[52] U.S. Cl.......................... 161/164, 65/30, 161/1, 161/165, 161/192, 161/199
[51] Int. Cl..... C03c 21/00, B32b 5/14, B32b 17/10
[58] Field of Search....................... 161/1, 164, 165, 161/166, 192, 199; 65/30

[56] References Cited
UNITED STATES PATENTS

| | | |
|---|---|---|
| 3,356,477 | 12/1967 | Chisholm et al........................ 65/30 |
| 3,357,876 | 12/1967 | Rinehart................................. 161/1 |
| 3,433,611 | 3/1969 | Saunders et al. ........................ 65/30 |
| 3,287,200 | 11/1966 | Hess et al. .............................. 65/30 |
| 3,445,316 | 5/1969 | Megles.................................... 161/1 |
| 3,410,673 | 11/1968 | Marusak ................................. 65/30 |
| 3,301,649 | 3/1964 | Marusak ................................. 65/30 |
| 3,495,967 | 2/1970 | Buckley et al.......................... 161/1 |
| 3,558,415 | 1/1971 | Reiser et al.......................... 161/199 |

Primary Examiner—Daniel J. Fritsch
Attorney—Hans Berman et al.

[57] ABSTRACT

In a process of strengthening a glass article by substituting potassium ions for sodium ions in the surface layer of the article at an elevated temperature below the strain point of the glass, whereby a compressive stress is developed in the layer, a glass having a viscosity and devitrification characteristics similar to those of conventional sheet glass is employed. The glass consists essentially of 60 to 75% $SiO_2$, 4 to 15% $Al_2O_3$, 8 to 15% $Na_2O$, 4 to 10% $K_2O$, 1 to 8% MgO and/or ZnO by weight.

5 Claims, 2 Drawing Figures

GLASS STRENGTHENED BY ION AND METHOD OF PREPARING THE SAME

This application is a continuation of the copending application Ser. No. 52,406, filed on July 6, 1970, and now abandoned.

This invention relates to the strengthening of a glass article by ion exchange and to the article so strengthened. More particularly, this invention relates to the strengthening of a glass article by exchanging sodium ions present in the surface layer of the glass article for potassium ions and to the strengthened glass article.

It is known to strengthen a glass article containing sodium ions by contact with a molten salt containing alkali metal ions which have a diameter greater than that of the sodium ions. The potassium ions are substituted for those of sodium, and a compressive stress is developed in the surface layer of the glass article [Journal of the American Ceramic Society, Vol. 45, No. 2 (February 1962), pages 59–67].

However, when this method is applied to a conventional soda-lime glass, such as window glass, drawn glass, float glass, rolled glass or plate glass, the rate of ion exchange is extremely slow. A stressed layer having a thickness of 30 to 40 microns is developed only in about 15 to 20 hours. If it is attempted to increase the thickness of the stressed layer by either prolonging the treating time or by elevating the treating temperature, the strength of the glass article is reduced by relaxation of the compressive stress.

The object of the present invention is an improvement in the prior art method of strengthening a glass article by ion exchange.

Another object of this invention is the provision of a glass composition suitable for continuous sheet glass forming processes, such as the Froucault process, Pennvernon or Pittsburgh process, Colburn process, or float process, and capable of acquiring sufficient strength in a relatively short period of time by ion exchange treatment.

A glass to be employed in the method according to the present invention is required to retain viscosity and devitrification characteristics of a conventional sheet glass, that is, the following ranges of viscosity reference points and liquidus temperature:

Strain point—450° – 550° C
Working point—980° – 1,150° C
Liquidus temperature—below 1,100° C Strain point is the temperature at which the viscosity of glass is $10^{14.5}$ poise; working point is the temperature at which the viscosity of glass is $10^4$ poise.

We have found that a glass satisfying these conditions and sufficiently strengthened by a short ion exchange treatment consists essentially, by weight, of 60 – 75% $SiO_2$; 4 – 15% $Al_2O_3$; 0 – 3% $TiO_2$; 0 – 3% $ZrO_2$; the $SiO_2$, $Al_2O_3$, $TiO_2$ and $ZrO_2$ constituting 70 – 82% by weight of the glass composition; 4 – 10% $K_2O$; 8 – 15% $Na_2O$; 1 – 8% RO, wherein RO represents at least one divalent oxide selected from the group consisitng of 0 – 8% MgO, 0 – 8% ZnO and 0 – 2% CaO, PbO, BaO, SrO and mixtures thereof, and 0 – 4% $B_2O_3$; the $SiO_2$, $Al_2O_3$, $TiO_2$, $ZrO_2$, $K_2O$, $Na_2O$, RO and $B_2O_3$ constituting at least 98% of the glass composition.

The glass composition is shaped and subjected to an ion exchange treatment in which sodium ions contained in the glass surface are replaced by potassium ions present in the molten salt which is in contact with the glass article, whereby the glass article is strengthed.

In the appended drawing:
FIG. 1 is a diagram showing the logarithm of viscosity (poise) as a function of the reciprocal value of the absolute temperature (° K) for a glass of the invention and a float glass of conventional composition.

Figure 2:
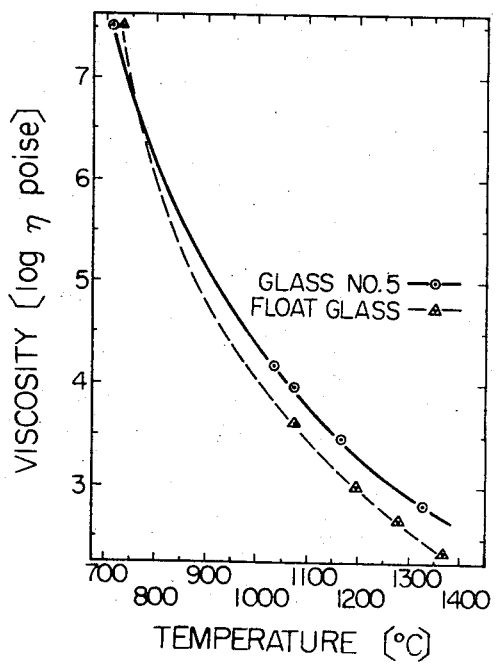

FIG. 2 shows the logarithm of viscosity as a function of temperature in ° C for the same glasses at temperatures higher than those of FIG. 1.

The glass to be strengthened must be within the composition limits indicated above for the following reasons:

An excessive or insufficient content of $SiO_2$ will cause easy devitrification and make the forming of sheet glass difficult. If the $SiO_2$ content is too high, the glass becomes hard, and the melting and forming of the glass is difficult. However, the $SiO_2$ content should be as high as possible for a good ion exchange rate. Therefore, $SiO_2$ should be 60 to 75 percent by weight.

While an $Al_2O_3$ content in excess of 4 percent will increase the ion exchange rate, more than 15 percent will tend to devitrify the glass, and will increase the viscosity thereof.

$TiO_2$ makes the glass soft, but colored when present in an excessive amount. A small amount of $ZrO_2$ inhibits devitrification of the glass, but crystals of an excess are precipitated in the glass. Consequently, the $TiO_2$ and $ZrO_2$ should not exceed 3 percent each.

The combined amount of $SiO_2$, $Al_2O_3$, $TiO_2$ and $ZrO_2$ should be 70 to 82 percent by weight of the glass composition for proper devitrification tendency, viscosity characteristics, melting and forming properties, and ion exchange effect.

$K_2O$ increases the ion exchange rate. However, an excess will increase the viscosity of the glass. Therefore, the $K_2O$ content should be 4 to 10 percent by weight.

$Na_2O$ is the source of sodium ions for the ion exchange reaction. If it exceeds 15 percent by weight, the viscosity of the glass will be reduced, and its strain point will be lowered so as to relax the compressive stress developed by the ion exchange. On the other hand, with less than 8 percent $Na_2O$, the melting and forming properties of the glass article are impaired by an increase in viscosity, and the glass article tends to become devitrified.

MgO, ZnO, CaO, PbO or SrO, when exceeding 1 percent by weight, each improve the melting property of the glass, and the viscosity curve is made suitable for glass forming. When any one of the divalent ions is in excess of 8 percent by weight, the liquidus temperature of the glass rises, and the viscosity curve becomes nearly parallel with the ordinate in a chart such as FIGS. 1 and 2. Therefore, forming becomes difficult, and the ion exchange rate is lowered. MgO and ZnO are superior to other divalent ions in increasing the ion exchange rate, and may amount to 1 to 8 percent by weight. When CaO, PbO, BaO and SrO exceed 2 percent by weight, the ion exchange rate will be lowered.

$B_2O_3$ is helpful in controlling the viscosity curve of the glass without causing an excessive rise of the liquidus temperature. If $B_2O_3$ exceeds 4 percent, the glass tends to become nonuniform and the strain point is lowered.

The components discussed in the foregoing paragraphs should constitute at least 98 percent of the glass composition.

$Li_2O$ improves the melting and forming properties of the glass, but if it exceeds 2 percent by weight, the glass tends to be devitrified. For this reason, the $Li_2O$ content should not exceed 1 percent.

F, $As_2O_3$ and $Sb_2O_3$, which are impurities, should preferably not exceed 1 percent each.

The glass composition is prepared by melting a mixture of raw materials in the desired proportions according to the conventional method, refining or homogenizing the molten glass, and forming it into a desired shape. If necessary, the formed glass article is subjected to ion exchange treatment only after being annealed. Because of its temperature-viscosity characteristics and liquidus temperature, the glass of the invention is capable of being formed into sheet glass in continuous operation. The glass sheet can be subjected to an appropriate ion exchange treatment after being bent. The bending may be required for wind shields or rear windows of automobiles.

In carrying out the ion exchange treatment, the glass sheet is dipped into a molten salt bath containing potassium ions which is maintained at an elevated temperature not exceeding the strain point of the glass. The bath consists substantially of potassium nitrate, potassium sulfate, or of a mixture thereof. Satisfactory results are also obtained by applying a paste consisting of a mixture of an inert solid material, such as clay, and a potassium salt to the surface of the glass article, and then heating.

The treating temperature depends on the composition of the glass article. It should be below the strain point of the glass and above about 350° C, preferably lower than the strain point of the glass by about 30° to 50° C.

The thickness of the ion exchange layer increases approximately in proportion to the square root of the treating time. It should be noted, however, that the compressive stress in the surface layer of the glass article is relaxed by an increase in the treating time. Therefore, extended treatment is not practical. The preferred period of time for the treatment ranges from about 30 minutes to 2 hours. In this manner, the thickness of the stressed layer is made 30 to 60 microns, and the compressive stress is 40 to 60 kg/mm².

The compressive stress value and the thickness of the stressed surface layer are directly related to the strengthening effect.

The glass to be treated according to the present invention is continuously formed into a flat glass ribbon or a sheet in a conventional process. A single glass sheet strengthened by ion exchange treatment according to this invention can be used in windows for automobiles, airplanes and buildings, or a single sheet can be combined with an unstrengthened glass sheet or with a glass sheet strenthened either by tempering or by ion exchange to form a laminated glass product.

The method of the present invention is not limited to sheet or plate glass, but it can be used with equal effectiveness in the treatment of other glass articles, e.g., glass ware.

Details as to the working of this invention are given hereunder by way of Examples.

EXAMPLE 1

Samples of the glasses shown in Table 1 below were prepared by melting silica sand, potassium carbonate, magnesium carbonate, borax, lithium carbonate, feldspar, aluminum hydoxide, boric acid, petalite and the like in the proportions required in a 500 ml platinum crucible for about 10 hours at 1,500° C.

Thereafter, each melt was pressed into sheet form and the glass sheet was cut into samples 10 × 10 × 0.2 cm.

TABLE 1

| Glass sample No. | Glass composition (percent by wt.) | | | | | | | | | |
|---|---|---|---|---|---|---|---|---|---|---|
| | $SiO_2$ | $Al_2O_3$ | $ZrO_2$ | $TiO_2$ | $Li_2O$ | $Na_2O$ | $K_2O$ | $MgO$ | $ZnO$ | $B_2O_3$ |
| 1 | 74 | 5 | | | | 12 | 5 | 4 | | |
| 2 | 61 | 10 | | | | 14 | 7 | 8 | | |
| 3 | 66 | 15 | | | 0.4 | 12 | 4 | | 2.6 | |
| 4 | 62 | 10 | 1 | 1 | | 9 | 9 | 4 | 4 | |
| 5 | 65.1 | 10 | | | 0.4 | 11 | 7.5 | 2 | | 4 |
| 6 | 62 | 11 | | | | 9.5 | 9.5 | | 8 | |
| 7 | 67 | 10 | | | | 13.3 | 5.7 | | 4 | |
| 8 | 70 | 4 | | | | 12 | 6 | 6 | 2 | |

The strain point, working point, and liquidus temperature were measured for each sample. The results are shown in Table 2 below.

TABLE 2

| | Viscosity reference point | | |
|---|---|---|---|
| Glass sample No. | Strain point (° C.) | Working point (° C.) | Liquidus temperature (° C.) |
| 1 | 480 | 1,130 | No devitrification. |
| 2 | 530 | 1,120 | 1,030. |
| 3 | 490 | 1,060 | No devitrification. |
| 4 | 530 | 1,110 | 1,000. |
| 5 | 470 | 1,070 | No devitrification. |
| 6 | 520 | 1,140 | Do. |
| 7 | 470 | 1,070 | Do. |
| 8 | 520 | 1,120 | Do. |

The liquidus temperature was measured by keeping a rod of the tested glass for 15 hours in an electric furnace in which a temperature gradient was provided from 900° to 1,050° C, and by reading the maximum devitrification temperature. In Table 2 "No devitrification" means that no devitrification was observed at 900° to 1,050° C. The absence of devitrification observable by a microscope implies that either the glass article has a liquidus temperature lower than 900° C or the glass article has an extremely slow devitrification rate.

In carrying out the ion exchange treatment, each sample sheet was immersed in a bath of molten potassium nitrate ($KNO_3$) maintained at either 430° C or 450° C for 1 hour. Thereafter, the sample sheet was removed from the bath and washed in water. Table 3 below shows the ion exchange treating time, temperature and compressive stress values established on the surface of the strengthened glass sheet, and also the thickness of the stressed layer.

The viscosity curve for the glass No. 5 of Table 1 is shown in FIGs. 1 and 2.

TABLE 3

| Glass sample No. | Treating conditions | | | Compressive stress (kg./mm.²) | Thickness of stressed surface layer (microns) |
| --- | --- | --- | --- | --- | --- |
| | Salt bath | Temp. (°C.) | Period (hr.) | | |
| 1 | KNO₃ | 450 | 1 | 45 | 40 |
| 2 | KNO₃ | 450 | 1 | 60 | 30 |
| 3 | KNO₃ | 450 | 1 | 50 | 40 |
| 4 | KNO₃ | 450 | 1 | 60 | 40 |
| 5 | KNO₃ | 450 | 1 | 45 | 40 |
| 6 | KNO₃ | 430 | 1 | 55 | 40 |
| 7 | KNO₃ | 450 | 1 | 40 | 40 |
| 8 | KNO₃ | 450 | 1 | 55 | 30 |

For comparative purposes the viscosity curve of a commercial float glass also is shown in FIGS. 1 and 2. The composition of the float glass is as follows:

| | % by weight |
| --- | --- |
| $SiO_2$ | 72.2 |
| $Al_2O_3$ | 1.8 |
| CaO | 7.3 |
| MgO | 3.8 |
| $Na_2O$ | 13.7 |
| $K_2O$ | 0.7 |
| $SO_3$ | 0.3 |
| $Fe_2O_3$ | 0.1 |
| $TiO_2$ | 0.1 |

The liquidus temperature of this glass was 970° C.

From FIGS. 1 and 2, it will be realized that the glass treated by the present invention has a temperature-viscosity characteristic approximating that of conventional sheet glass or plate glass.

EXAMPLE 2

A glass having the composition shown in Table 1, No. 5, was molten in a small glass melting tank furnace, and sheet glass was formed from the molten glass by the Fourcault process. The sheet glass did not develop defects, such as devitrites, striae and stones common in conventional drawn sheet glass and had excellent surface quality. The sheet glass was effectively strengthened by ion exchange treatment as described in Example 1.

EXAMPLE 3

From a glass having the composition shown in Table 1, No. 5, a sheet 30 × 30 × 0.2 cm was formed. A conventional float glass sheet 30 × 30 × 0.3 cm was also prepared. Thereafter, the two glass sheets were bent. The curved glass of the invention was strengthened by ion exchange as in Example 1, and laminated to said float glass sheet by a polyvinyl butyral film having a thickness of 0.7 mm and inserted between the two glass sheets as a bonding agent.

The mechanical strength of the laminate was measured in the following manner.

A rubber ring having a thickness of 2 mm was set on a steel plate having a hole of 200 mm diameter, and the laminate was placed on the ring with the strengthened glass sheet on the underside. A steel rod having a diameter of 50 mm and a semispherical end was pushed downwardly to the center of the laminate until the sheet was destroyed. The strain in the glass sheet at the time of destruction was measured by a strain gauge. If the strain is $\epsilon$, Young's modulus $E$, and Poisson's ratio $\gamma$, the breaking stress $\delta$ can be calculated by the formula:

$$\delta = [E/(1 - \gamma)] \cdot \epsilon$$

It was found to be 70 kg/mm². This compares with the breaking stress of a laminated glass sheet consisting of two unstrengthened glass sheets having thicknesses of 2 mm and 3 mm, which was found to be 10 kg/mm².

What is claimed is:

1. A glass article containing sodium ions and potassium ions, having a surface layer under compressive stress, the concentration of potassium ions in the surface layer being greater than in the interior of the glass article, the interior of said glass article consisting essentially, by weight, of 60 to 75% $SiO_2$; 4 to 15% $Al_2O_3$; 0 to 3% $TiO_2$; 0 to 3% $ZrO_2$; said $SiO_2$, $Al_2O_3$, $TiO_2$ and $ZrO_2$ constituting 70 to 82% by weight of the glass composition in said interior; 4 to 10% $K_2O$; 8 to 15% $Na_2O$; 1 to 8% RO, wherein RO represents at least one divalent oxide selected from the group consisting of 0 to 8% MgO, 0 to 8% ZnO and 0 to 2% CaO, PbO, BaO, SrO, and mixtures thereof; and 0 to 4 % $B_2O_3$; said $SiO_2$, $Al_2O_3$, $TiO_2$, $ZrO_2$, $K_2O$, $Na_2O$, RO and $B_2O_3$ constituting at least 98% of said glass composition, the remainder of said composition essentially consisting of members of the group consisting of $Li_2O$, F, $As_2O_3$, and $Sb_2O_3$, each member of said group not exceeding 1 percent.

2. A glass article as claimed in claim 1, wherein the thickness of the layer under compressive stress is at least about 30 microns, and said compressive stress is at least about 40 kg/mm².

3. A method of strengthening a glass article, which comprises replacing sodium ions present in the surface layer of the glass article by potassium ions at an elevated temperature lower than the strain point of the glass of said article until a compressive stress is developed in said layer, wherein the improvement comprises providing a glass of said article which consists essentially, by weight of 60 to 75% $SiO_2$; 4 to 15% $Al_2O_3$; 0 to 3% $TiO_2$; 0 to 3% $ZrO_2$; said $SiO_2$, $Al_2O_3$, $TiO_2$ and $ZrO_2$ constituting 70 to 82% by weight of the glass composition; 4 10% $K_2O$; 8 to 15% $Na_2O$; 1 to 8% RO, wherein said RO represents at least one divalent oxide selected from the group consisting of 0 to 8% MgO, 0 to 8% ZnO and 0 to 2% CaO, PbO, BaO, SrO, and mixtures thereof; and 0 to 4% $B_2O_3$; said $SiO_2$, $Al_2O_3$, $TiO_2$, $ZrO_2$, $K_2O$, $Na_2O$, RO and $B_2O_3$ constituting at least 98% of the glass composition, the remainder essentially consisting of members of the group consisting of $Li_2O$, F, $As_2O_3$, and $Sb_2O_3$, each member of said group not exceeding one percent.

4. A method as claimed in claim 3, said sodium ions being repalced by contact of said glass article with molten potassium nitrate maintained at a temperature lower than the strain point of said glass by about 30° to 50° C.

5. A method as claimed in claim 4, contact of said glass article with said molten potassium nitrate being maintained for 30 minutes to 2 hours until a compressive stress of at least about 40 kg/mm² is developed in a surface layer of said article at least about 30 microns thick.

* * * * *